(12) United States Patent
Deicke

(10) Patent No.: US 9,689,775 B2
(45) Date of Patent: Jun. 27, 2017

(54) TEST APPARATUS AND METHOD FOR TESTING A FIRST AND/OR A SECOND ELECTRICAL MACHINE

(71) Applicant: Siemens Aktiengesellschaft, München (DE)

(72) Inventor: Matthias Deicke, Uetze/Schwüblingsen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 351 days.

(21) Appl. No.: 14/365,356

(22) PCT Filed: Nov. 14, 2012

(86) PCT No.: PCT/EP2012/072575
§ 371 (c)(1),
(2) Date: Jun. 13, 2014

(87) PCT Pub. No.: WO2013/087329
PCT Pub. Date: Jun. 20, 2013

(65) Prior Publication Data
US 2014/0361807 A1    Dec. 11, 2014

(30) Foreign Application Priority Data

Dec. 14, 2011 (DE) .......................... 10 2011 120 939
Jun. 18, 2012 (DE) .......................... 10 2012 210 191

(51) Int. Cl.
*G01M 13/02* (2006.01)

(52) U.S. Cl.
CPC ........ *G01M 13/027* (2013.01); *G01M 13/026* (2013.01)

(58) Field of Classification Search
CPC .. G01M 13/027; G01M 13/026; G01M 13/00; G01M 13/02; G01M 13/021;
(Continued)

(56) References Cited

U.S. PATENT DOCUMENTS 1,482,706 A * 2/1924 Short .................... G01M 13/02
73/162
2,371,607 A   3/1945 Collins
(Continued)

FOREIGN PATENT DOCUMENTS

DE    3100848 A1    8/1982
DE    19921031 A1 * 11/1999 ............ G01M 3/022
(Continued)

OTHER PUBLICATIONS

Machine generated English translation of foreign patent JP 8-86721, Sotani Kazuyuki, Apr. 1996.*
(Continued)

*Primary Examiner* — Tung X Nguyen
*Assistant Examiner* — Lee Rodak
(74) *Attorney, Agent, or Firm* — Henry M. Feiereisen LLC

(57) ABSTRACT

A first and/or a second electrical machine is tested using a test apparatus that includes a torque transmitter having torque connections for the first and the second electrical machine and an electrical shaft having respective electrical connections for the first and the second electrical machine. The electrical shaft is designed to transmit at least five times as much electrical power between the respective electrical connections as can be supplied by a supply apparatus of the test apparatus from an external electrical energy source to the electrical shaft. This condition is assumed to be satisfied
(Continued)

when the test apparatus lacks such a supply apparatus. A corresponding method using such test apparatus is also disclosed.

11 Claims, 3 Drawing Sheets

(58) Field of Classification Search
 CPC ............. G01M 13/022; G01M 13/023; G01M 13/025; G01M 15/02; G01L 3/22; G01L 3/24; G01L 3/26; G01L 3/109; G01L 3/242; G01L 3/00; G01L 5/0076; G01L 5/108; G01L 5/282; G01L 25/003; Y02E 10/722; B23Q 1/5406
 USPC ............. 73/862, 862.01–862.69; 324/765.01
 See application file for complete search history.

(56) References Cited

U.S. PATENT DOCUMENTS 3,595,073 A * 7/1971 Morris .................. G01R 31/34
 73/862.17
4,335,619 A * 6/1982 Wetzel ................. G01R 31/343
 73/862.17

FOREIGN PATENT DOCUMENTS

| DE | 199 18 820 | | 11/2000 | |
|----|------------|---|---------|---|
| EP | 0627575 A1 | | 12/1994 | |
| EP | 2574777 A1 | * | 4/2013 | .......... G01M 13/026 |
| JP | 8-86721 | * | 4/1996 | ............... G01L 3/22 |
| WO | WO 2011104091 A1 | | 9/2011 | |

OTHER PUBLICATIONS

English Machine Translation of Ramcke DE 19921031.*
Athanassios M. et al; "A New System for Testing Gears Under Variable Torque and Speed"; Recent Patents on Mechanical Engineering 2009; vol. 2; No. 3; pp. 179-192; retrieved from Internet:: URL: http://www.benthamscience.com/meng/samples/meng2-3-tar/0002MENG.pdf; DOI: 10.2174/1874477X10902030179; XP055018826; 2009; Nov. 1, 2009.
International Search Report issued by the European Patent Office in the international application PCT/EP2012/072575 on Mar. 13, 2013.

* cited by examiner

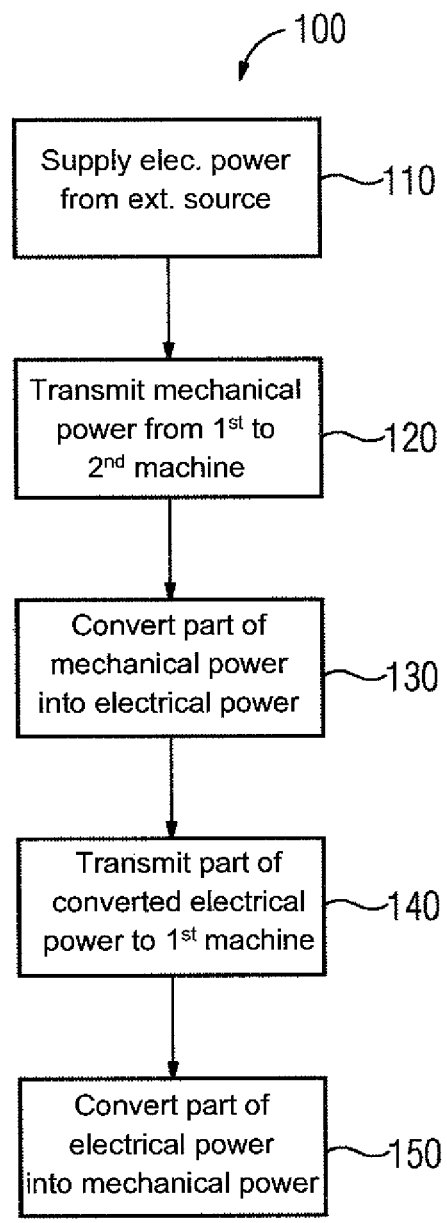

TEST APPARATUS AND METHOD FOR TESTING A FIRST AND/OR A SECOND ELECTRICAL MACHINE

CROSS-REFERENCES TO RELATED APPLICATIONS

This application is the U.S. National Stage of International Application No. PCT/EP2012/072575, filed Nov. 14, 2012, which designated the United States and has been published as International Publication No. WO 2013/087329 and which claims the priority of German Patent Applications, Serial No. 10 2011 120 939.9, filed Dec. 14, 2011, and Serial No. 10 2012 210 191.8, filed Jun. 18, 2012, pursuant to 35 U.S.C. 119(a)-(d).

BACKGROUND OF THE INVENTION

The invention relates to a test apparatus for testing a first and/or a second electrical machine, said test apparatus comprising: a torque transmitter for transmitting a torque between a first electrical machine and a second electrical machine, wherein the torque transmitter has a torque connection for the first electrical machine and a torque connection for the second electrical machine; an electrical shaft which has a first electrical connection for the first electrical machine and a second electrical connection for the second electrical machine. The synchronous generator (SG) to be tested and/or the gear unit to be tested can also be termed the 'device under test' (DUT). 'Torque transmitter' is here to be understood as meaning a device by means of which a torque can be transmitted. A torque transmitter can comprise, for example, a gear unit, a clutch, a shaft, a lever or some other device (in particular a mechanical, electromechanical or hydromechanical device) by means of which a torque can be transmitted. Another torque transmitter (in particular a gear unit under test) can be a to-be-tested part of the first and/or the second electrical machine. The gear unit of the first mentioned and/or of the other torque transmitter can be e.g. part of a hybrid drive system (HDS) in each case.

The invention also relates to a method for testing a first and/or a second electrical machine, comprising the following steps: supplying electrical power from an external power source to the first electrical machine for conversion of the supplied electrical power into mechanical power and/or supplying mechanical power to the first electrical machine; transmitting mechanical power from the first electrical machine to the second electrical machine; converting at least some of the mechanical power supplied to the second electrical machine into electrical power by means of the second electrical machine; transmitting to the first electrical machine, via an electrical shaft, at least some of the electrical power that was generated by the second electrical machine by means of the conversion of mechanical power; and converting at least some of the electrical power that was supplied to the first electrical machine by the second electrical machine into mechanical power by means of the first electrical machine.

DE 199 18 820 B4 describes a test rig for testing drive components. A first controller checks a power flow to a first electric motor used as a first torque generator. A second controller checks a power flow to a second electric motor used as a second torque generator. Both controllers are supplied from an AC line.

This known test apparatus is characterized by a high electrical power consumption during operation. This results in high energy costs and high acquisition and operating costs for the controllers.

SUMMARY OF THE INVENTION

The object of the present invention is to provide a test apparatus for testing a first and/or a second electrical machine, said apparatus being less expensive to acquire and operate than the known test apparatus.

This object is achieved according to the invention by the test apparatus for testing a first and/or a second electrical machine comprising the following:
a torque transmitter for transmitting a torque between a first electrical machine and a second electrical machine, wherein the torque transmitter has a torque connection for the first electrical machine and a torque connection for the second electrical machine;
an electrical shaft which has a first electrical connection for the first electrical machine and a second electrical connection for the second electrical machine;
wherein the electrical shaft is designed to transmit as much electrical power, at least by a factor v, between the first electrical connection and the second electrical connection as the maximum electrical energy from an external electrical power source that injection devices of the test apparatus are designed to inject into the electrical shaft, wherein v is at least 5 and it is assumed that the stated condition for v is fulfilled if the test apparatus does not comprise such an injection device.

Method for testing a first and/or a second electrical machine, wherein the method comprises the following steps:
supplying electrical power from an external power source to the first electrical machine for conversion of the supplied electrical power into mechanical power and/or supplying mechanical power to the first electrical machine;
transmitting mechanical power from the first electrical machine to the second electrical machine;
converting at least some of the mechanical power that was supplied to the second electrical machine into electrical power by means of the second electrical machine;
transmitting to the first electrical machine, via an electrical shaft, at least some of the electrical power that was generated by the second electrical machine by means of the conversion of the mechanical power; and
converting at least some of the electrical power that was supplied from the second electrical machine to the first electrical machine into mechanical power by means of the first electrical machine;
characterized in that the electrical shaft is designed to transmit as much electrical power, at least by a factor v, between the first electrical machine and the second electrical machine as the maximum electrical energy from an external electrical power source that injection devices of the test apparatus are designed to inject into the electrical shaft, wherein v is at least 5 and it is assumed that the stated condition for v is fulfilled if the test apparatus does not comprise such an injection device.

Because of the electrical shaft, only the powers required for starting up the test apparatus and compensating the ongoing losses, and the torques required for that purpose, need to be applied. This reduces the costs involved in acquiring and operating the external power source.

In the case of electrical injection, a power requirement can be reduced compared to known test rigs by minimizing frequency and/or voltage conversions in the electrical shaft. By avoiding frequency and/or voltage conversions in the electrical shaft, losses are avoided where they cause the greatest damage in absolute value terms (i.e. in the area of the power circuit of the circulating main power). In view of the different absolute values, it is on the whole more advantageous to accept a percentage-wise lower efficiency in the area of the mechanical drive source and/or in the area of the injection devices if it means that a percentage-wise equal reduction of losses can be achieved in the electrical shaft (i.e. where the absolute power values are at their highest).

For this reason it may be more cost-effective to inject the required power mechanically into a drive shaft of one of the two electrical machines. This enables a power requirement for maintaining the power circulation to be reduced compared to a power requirement of known test rigs. An auxiliary drive for mechanically injecting the necessary power requires only approx. 8% of the test rig power and can therefore still be implemented in inexpensive low-voltage technology even in the case of large test rig powers of e.g. 7.7 MW or 14.2 MW.

It is preferable if the factor v is at least 6, preferably at least 7 or 8, with particular preference at least 9. The higher the factor v, the lower the energy consumption and energy costs of the test apparatus during operation.

An advantageous further development provides that the test apparatus comprises a mechanical drive device for coupling mechanical power into the first and/or into the second electrical machine. As a result, the power that is to be supplied to the test apparatus during operation does not need to be taken into account for dimensioning electrical shaft components.

It is also conceivable for the test apparatus to comprise a mechanical drive device for coupling mechanical power into the torque transmitter. This obviates the need for a second shaft connection (on one of the two electrical machines).

It is particularly preferred if the test apparatus comprises a device for twisting a stator of the first electrical machine with respect to a stator of the second electrical machine and/or if the test apparatus comprises a device for twisting a stator of the second electrical machine with respect to a stator of the first electrical machine. This enables the rotating fields of the two electrical machines to be twisted counter to one another by a desired angle. In this way the two electrical machines can be simultaneously electrically and mechanically counter-biased in order to carry out torque tests.

The test apparatus can also be defined such that it also comprises the first and/or the second electrical machine. If the test apparatus comprises one of the two electrical machines from the outset, tests can be carried out on the other electrical machine after minimal set-up time.

An advantageous embodiment provides that the first electrical machine and/or the second electrical machine is a synchronous machine. Because of the electrical shaft, the test apparatus is particularly suitable for carrying out tests on synchronous machines and gear unit tests using synchronous machines.

Other further developments provide that the electrical shaft comprises a phase shifter and/or that the electrical shaft comprises no transducer or that the electrical shaft comprises a frequency converter or two series-connected frequency converters or inverters. The variant without any transducer or frequency converter in the electrical shaft is particularly preferred, as it enables power losses in the main power circulation to be minimized.

In a particularly preferred further development, the injection device comprises a frequency converter. This enables a line voltage to be matched in the required manner to voltage and phase relationships of the electrical shaft.

BRIEF DESCRIPTION OF THE DRAWING

The invention will now be explained in greater detail with reference to the accompanying drawings, in which.

DETAILED DESCRIPTION OF PREFERRED EMBODIMENTS

The examples described in greater detail below represent preferred embodiments of the present invention.

Figure 1:
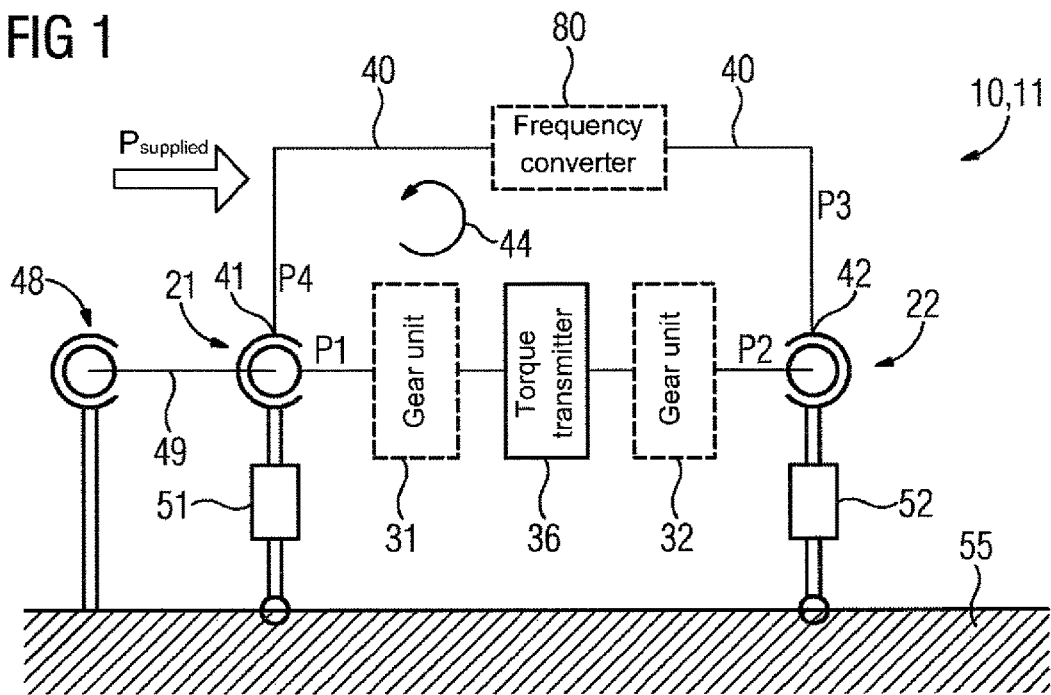
FIG. 1 schematically illustrates a first embodiment of a test apparatus according to the invention, FIG. 2 schematically illustrates a second embodiment of a test apparatus according to the invention, FIG. 3 schematically illustrates a third embodiment of a test apparatus according to the invention, FIG. 4 schematically illustrates a sequence of a test method according to the invention.

The first embodiment 11 shown in FIG. 1 comprises a first electrical machine 21 having a first gear unit 31 and a second electrical machine 22 having a second gear unit 32. The first electrical machine 21 comprises a first shaft (not shown in the figure) which is conjoint with a gear shaft of the first gear unit 31 or is non-rotatably connected thereto. Likewise the second electrical machine 22 forms a second shaft (not shown in the figure) which is conjoint with a gear shaft of the second gear unit 32 or is non-rotatably connected thereto. In addition, an output shaft of the first gear unit 31 is non-rotatably connected to an output shaft of the second gear unit 32 by means of a flange 36. The two electrical machines 21, 22 are preferably of identical construction. It is likewise preferred if the two gear units 31, 32 are of identical construction. A typical example would be wind turbine gearboxes for a rated capacity of 3 MW which can be tested on the drive side at 13 rpm and on the power take-off side at 430 rpm.

Figure 2:
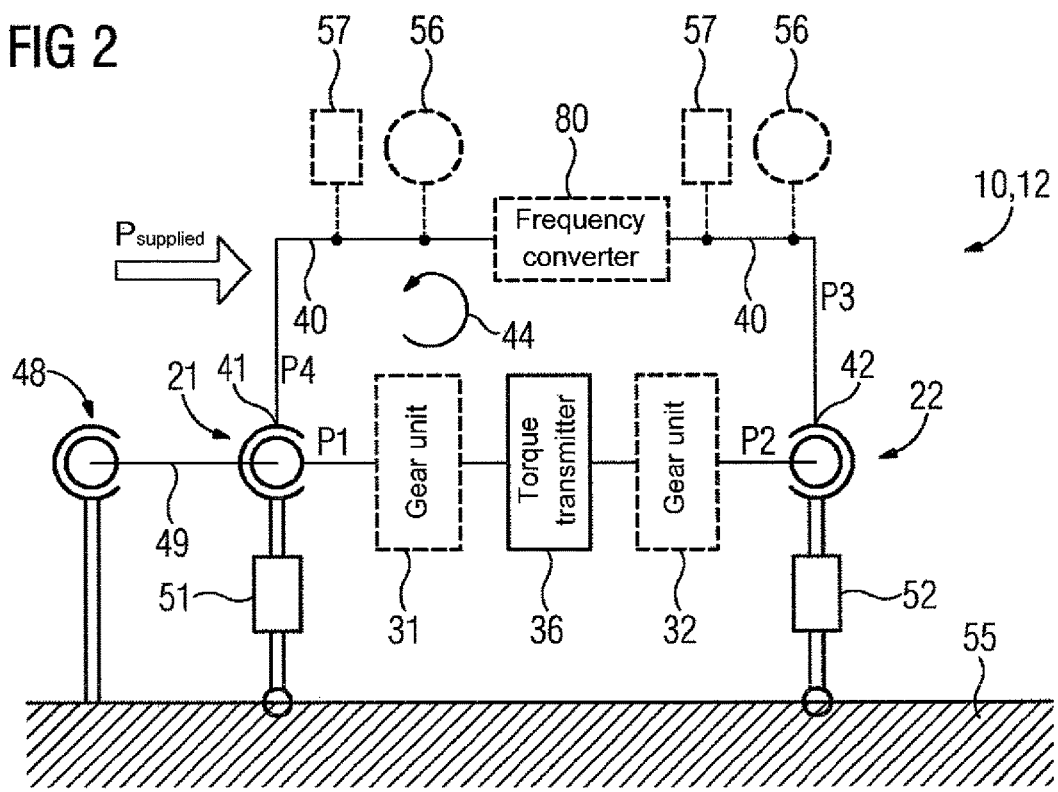
Figure 3:
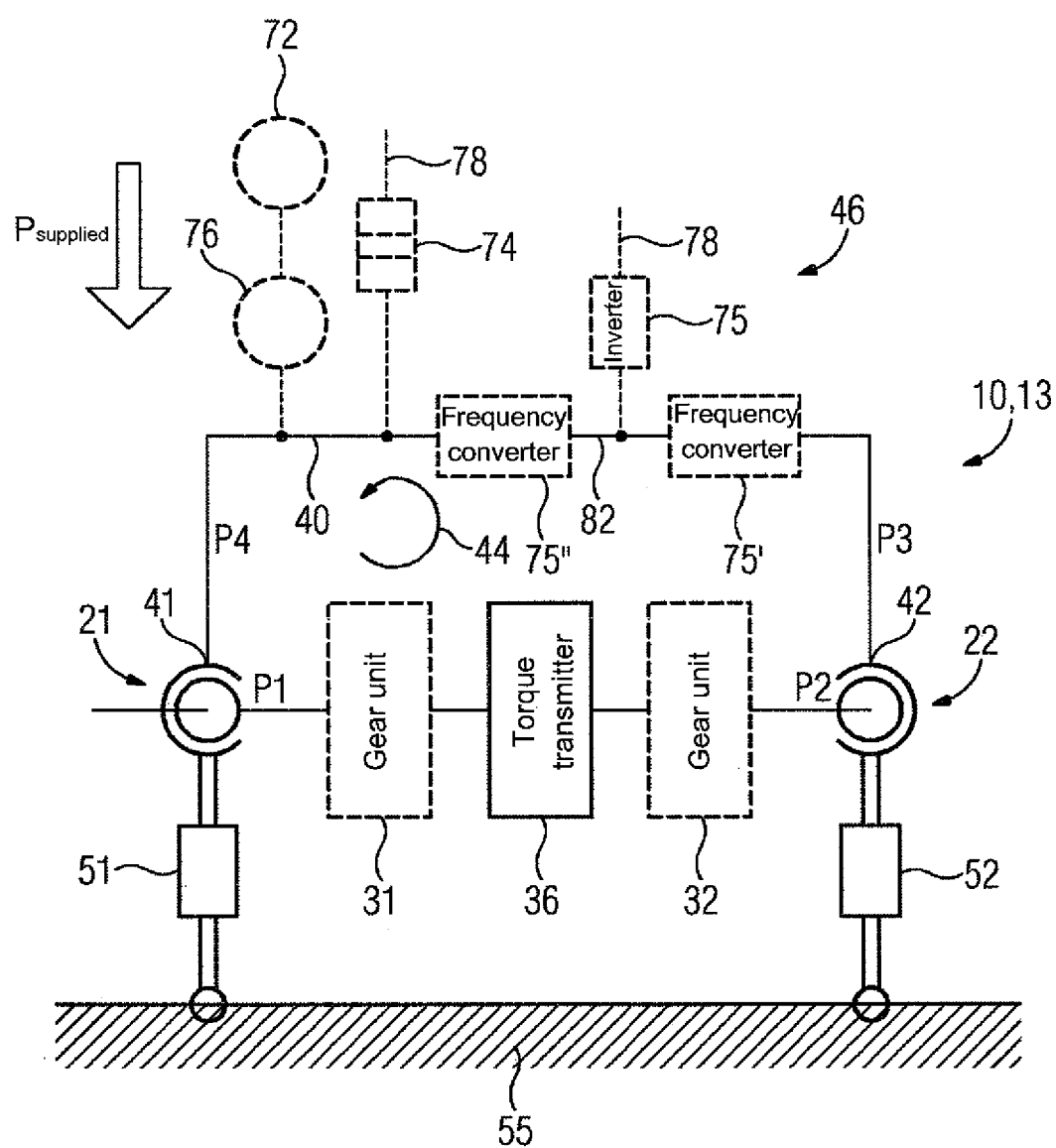

FIGS. 1 to 3 are also applicable if the first 31 and/or the second 32 gear unit is not of comprehensive design, but is only for torque transmission which, in the simplest case, takes place by means of the respective motor shaft. In this case the respective gear unit 31, 32 can be regarded as a gear unit having a 1:1 transmission ratio. In all the figures, dashed boundary lines indicate that the units in question are optional.

The two electrical machines 21, 22 are typically synchronous machines, wherein the rotor carries at least one field winding or a permanent magnet in each case and the stators thereof each carry induction windings. The two electrical machines 21, 22 are interconnected in the same direction of rotation (e.g. in the phase sequence UVW or in the phase sequence UWV) via an electrical shaft 40. For connecting the first electrical machine 21, the electrical shaft 40 comprises a first electrical connection 41. For connecting the second electrical machine 22, the electrical shaft 40 comprises a second electrical connection 42.

In order to generate a torque between the two electrical machines 21, 22, if the stators of the two electrical machines 21, 22 are of identical construction and identical angular position and the two gear units 31, 32 have an identical transmission ratio, it suffices in the simplest case, prior to putting the test apparatus 10 into operation, to fix the rotors of the electrical machines 21, 22 to one another by means of the flange 36 in a position in which they are twisted counter to one another by a desired peripheral angle.

Alternatively or additionally, the first electrical machine 21 can be mounted on an inclining or swiveling framework 51 with which its stator can be twisted through a first peripheral angle with respect to a stator of the second electrical machine 22 about an axis of rotation of the first electrical machine 21. The second electrical machine 22 is preferably fixed to a part of a building 55, e.g. a shop floor, to which the framework 51 of the first electrical machine 21 is also fixed. Alternatively or additionally, the second electrical machine 22 can also be mounted on an inclining or swiveling framework 52 with which its stator can be twisted through a second peripheral angle with respect to a stator of the first electrical machine 21 about an axis of rotation of the second electrical machine 22.

By twisting the stator of the first electrical machine 21 relative to the stator of the second electrical machine 22, the rotating fields of the two electrical machines 21, 22 can be twisted counter to one another by a desired constant or variable amount (angular offset) for test purposes. As a result, a different electrical phase relation can be set between the ends 41, 42 of the electrical shaft 40. The different phase relation between the ends 41, 42 of the electrical shaft 40 represents a potential difference between the ends 41, 42 of the electrical shaft 40. As the phase lines of the electrical shaft are (good) conductors, this potential difference results in a current which also flows through the induction windings of the electrical machines 21, 22 and drives their rotors by means of Lorentz force. One of the two electrical machines 21, 22 here acts as a generator and the other as a motor.

Alternatively and/or additionally, a frequency converter 80 (FU) can also be used to twist the rotating fields of the electrical machines 21, 22 counter to one another and thus achieve the same result as can be achieved by rotating the mounting framework 51, 52 of the first 21 or the second 22 electrical machine.

During operation, continuous conversion of electrical energy into mechanical energy and vice versa takes place. This results in friction losses $P_r$ which generate heat and sound, and ohmic losses $P_{ohm}$ which generate heat. In order to start up the test apparatus 10 and/or maintain operation of the test apparatus 10, these types of loss $P_r$, $P_{ohm}$ can be compensated by supplying mechanical and/or electrical energy. This ensures that energy that was injected into the power circulation 44 of the test apparatus 10 when the test apparatus was put into operation (at startup) can continue to circulate in the power circuit 44 of the test apparatus 10. A continuous power flow is therefore maintained in the power circuit 44, the power $P_{circuit}$ of which is higher or can be much higher than a power $P_{supply}$ with which energy was injected into the power circuit 44 of the test apparatus 10 when the test apparatus 10 was put into operation (at startup).

For supplying mechanical energy, the shaft of the first electrical machine 21 is also brought out on another side of the electrical machine 21 and non-rotatably connected to the drive shaft 49 of an auxiliary motor 48.

During testing in the test apparatus 10, the power loss for each gear unit 31, 32 can be e.g. 2% and for each electrical machine 21, 22 e.g. 2%, so that the external power source 46 (see FIG. 3), 48 then needs to continuously replace only 8% of the power circulating in the power circuit 44. Therefore, at startup of the test apparatus 10 (and also thereafter) the full power $P_{full}$ and/or the full torque $M_{full}$ does not need to be applied by the power source 46, 48, but only as much power and torque as is required to overcome static friction and compensate the ongoing losses $P_r$, $P_{ohm}$. The lower the static friction and the rolling friction, the smaller the possible size of the external power source 46, 48. As well as avoiding EMC problems and in addition to the direct cost benefits in the case of large test rigs 10, reducing the power $P_{supply}$ of the external power source 46, 48 also has the advantage that the external power source 46, 48 can then be operated at lower voltage and expensive medium-voltage converters can be dispensed with.

By way of comparison: in large test apparatuses according to the prior art, two 4-quadrant frequency converters are connected in series in the electrical shaft, each exhibiting a power loss of about 3%. The two transformers on the line-side tap (rated 10 to 30 kV) between the frequency converters (which are designed for 690 V on the line side) each contribute about 1% to the power loss. Overall, the power losses in the power circuit in the case of test apparatuses according to the prior art amount to some 16%. By eliminating the two series-connected 4-quadrant frequency converters and the transformers on the line-side tap, approximately 8% of the energy costs for operating the test rigs can be saved (aside from the acquisition costs for these devices).

However, the rotors and the gear units 31, 32 have moments of inertia which have to be accelerated at startup of the test apparatus 10, with the result that startup of the test apparatus 10 takes longer, the lower the power of the external power sources 46 (see FIG. 3), 48 taken together.

The power needed in order to inject the required energy into the power circulation 44 of the test apparatus 10 when the test apparatus 10 is put into operation (at startup) and to maintain the power circulation 44 during operation is essentially lower (e.g. by a factor of 10) than a power for which an electrical energy supply from the AC line is designed in the case of known devices. An advantage of the present invention is therefore that electrical power sources 46 (see FIG. 3) and/or mechanical drives 48 can be used which are less expensive than energy supply devices of known test apparatuses.

The second embodiment 12 shown in FIG. 2 comprises, additionally to the first embodiment 11 shown in FIG. 1, an electronic and/or an inductive phase shifter 56 and/or a load reactor 57 which is connected to the electrical shaft 40 and with which a phase relation of the electrical shaft 40 and therefore an operating point of the test apparatus 10 can be influenced. This can be useful particularly for testing permanent-magnet synchronous generators 21, 22. An inverter, for example, can be used as the phase shifter 56.

FIGS. 1 and 2 use dashed lines to show one or two optional frequency converters 80 in the electrical shaft 40. The frequency converter 80 can also be used to twist the rotating fields of the electrical machines 21, 22 counter to one another in order to achieve the same result as can be achieved by rotating the mounting framework 51, 52 of the first 21 or the second 22 electrical machine. By means of the frequency converter 80, the two electrical machines 21, 22 can be operated in a synchronized manner with a different pole pair ratio in the test apparatus 11, 12, 13 even if the transmission ratio of the two gear units 31, 32 is the same. The same applies if a difference in the number of pole pairs of the electrical machines 21, 22 is not compensated by a difference in the transmission ratio of the two gear units 31, 32.

Alternatively or additionally to the mechanical energy supply for starting up and/or maintaining operation, electrical energy $P_{elec}$ can also be supplied to the power circuit 44. For this, FIG. 3 shows an example involving a third embodiment 13 in which an electrical power source 46 is designed to inject electrical energy into the electrical shaft 40. In this case mechanical injection of energy by means of an auxiliary motor 48 can be dispensed with. The electrical injection 46 can come from an electrically and/or mechanically driven auxiliary generator 72 and/or via a frequency converter 74 and/or from another three-phase source. The frequency converter 74 can be supplied from three-phase system 78 or from another three-phase source.

In addition, FIG. 3 shows the possibility, likewise combinable with other exemplary embodiments, of supplying electrical energy, for startup and/or maintaining operation, to an intermediate circuit 82 in DC technology of a frequency converter 75', 75" looped into the electrical shaft. The line-side energy can then be supplied via a rectifier or an inverter 75.

The method 100 shown in FIG. 4 for testing a first 21 and/or a second 22 electrical machine comprises the following steps: in a first step 110 an electrical power $P_{elec}$ from an external power source 72, 74, 76, 78 is supplied to a first electrical machine 21 for conversion of the supplied electrical power $P_{mech}$, $P_{elec}$ into mechanical power $P_1$ and/or a mechanical power $P_{mech}$ is supplied to the first electrical machine 21. In a second step 120, a mechanical power $P_2$ is transmitted from the first electrical machine 21 to the second electrical machine 22. In a third step at least some of the mechanical power $P_2$ that was supplied to the second electrical machine 22 is converted into electrical power $P_3$ by means of the second electrical machine 22. In a fourth step 140 at least some of the electrical power $P_3$ that was generated by the second electrical machine 22 by conversion of mechanical power (from at least some of $P_2$) is transmitted to the first electrical machine 21. In a fifth step 150 at least some of the electrical power $P_4$ that was supplied to the first electrical machine 21 from the second electrical machine 22 is converted into mechanical power by means of the first electrical machine 21. The electrical shaft is designed to transmit, between the first electrical machine 21 and the second electrical machine 22, as much electrical power, at least by a factor v, as the maximum electrical energy from an external electrical energy source 72, 74, 76, 78 that injection devices 72, 74, 76 of the test apparatus 10 are designed to inject into the electrical shaft 40, wherein v is at least 5 and it is assumed that the specified condition for v if fulfilled if the test apparatus 10 does not comprise such an injection device 72, 74, 76.

Using the test apparatus 10, particularly comprising each of the embodiments, functions of the first 21 and/or the second 22 electrical machine can be tested at different speeds. The invention, particularly each of the embodiments, can also be carried out using test apparatuses 10 which support more than three phases. All the frequency converters 74, 80 (FU) mentioned are preferably four-quadrant frequency converters.

In the case of operation without gear units 31, 32, tests can be performed on synchronous generators 11, 12, 13. This is advantageous because it obviates the need for load reactors which are otherwise required for electrical substitute testing of synchronous generators by means of no-load and short-circuit tests. Particularly in the case of permanent-magnet synchronous generators (PMG), the load reactors are expensive because a separate load reactor must be developed and manufactured for each generator variant.

The invention claimed is:

1. A test apparatus for testing at least one of a first and a second electrical machine, the test apparatus comprising:
   a torque transmitter comprising a torque connection for the first electrical machine and a torque connection for the second electrical machine for transmitting a torque between the first electrical machine and the second electrical machine;
   an electrical shaft having a four-quadrant frequency converter, a first electrical connection for the first electrical machine and a second electrical connection for the second electrical machine, wherein the electrical shaft is designed to transmit, between the first electrical connection and the second electrical connection, at least five times as much electrical power as is provided from an external electrical energy source to the electrical shaft of the test apparatus, and wherein at least five times of the electrical power can be transmitted when the test apparatus fails to include the external electrical energy source;
   a mechanical drive device for coupling mechanical power into at least one of the first electrical machine, the second electrical machine and the torque transmitter; and
   a device for rotating a stator of the first electrical machine relative to a stator of the second electrical machine or for rotating the stator of the second electrical machine relative to the stator of the first electrical machine.

2. The test apparatus of claim 1, wherein at least six times as much electrical power is transmitted by the electrical shaft.

3. The test apparatus of claim 1, wherein at least seven times as much electrical power is transmitted by the electrical shaft.

4. The test apparatus of claim 1, wherein at least eight times as much electrical power is transmitted by the electrical shaft.

5. The test apparatus of claim 1, wherein at least nine times as much electrical power is transmitted by the electrical shaft.

6. The test apparatus of claim 1, wherein the test apparatus also comprises at least one of the first and the second electrical machine.

7. The test apparatus of claim 6, wherein at least one of the first electrical machine and the second electrical machine is a synchronous machine.

8. The test apparatus of claim 1, wherein the electrical shaft comprises a phase shifter.

9. The test apparatus of claim 1, wherein the electrical shaft lacks a transducer.

10. The test apparatus of claim 1, wherein the electrical shaft comprises two series-connected frequency converters or rectifiers.

11. The test apparatus of claim 1, wherein the external electrical energy source comprises a frequency converter.

* * * * *